United States Patent [19]
Leenhouts

[11] 3,749,995
[45] July 31, 1973

[54] METHOD AND APPARATUS FOR PRODUCING DIGITAL CONTOUR MOVEMENT ON AT LEAST THREE AXES

[75] Inventor: Albert C. Leenhouts, Harwinton, Conn.

[73] Assignee: The Superior Electric Company, Bristol, Conn.

[22] Filed: July 5, 1972

[21] Appl. No.: 269,271

[52] U.S. Cl. .................. 318/570, 318/574, 318/603, 318/685
[51] Int. Cl. ............................................ G05b 19/24
[58] Field of Search ..................... 318/39, 685, 573, 318/574, 570, 603

[56] References Cited
UNITED STATES PATENTS

| | | | |
|---|---|---|---|
| 2,833,941 | 5/1958 | Rosenberg et al. | 318/39 X |
| 3,461,365 | 8/1969 | Newland et al. | 318/685 X |
| 3,416,056 | 12/1968 | Motooka et al. | 318/573 |
| 2,996,348 | 8/1961 | Rosenberg | 318/570 X |
| 3,497,780 | 2/1970 | Leenhouts | 318/574 |
| 3,525,917 | 8/1970 | Leenhouts | 318/570 |
| 3,585,478 | 6/1971 | Leenhouts | 318/574 X |

Primary Examiner—B. Dobeck
Attorney—Arthur A. Johnson and Ernest M. Jenkins

[57] ABSTRACT

A method and apparatus for producing movement substantially along a path defined by information of the length of movement on each of three or four axes with the movement consisting of a plurality of sequentially taken, equal length increments or steps with each step being taken along one of the three or four axes and with there being a determination made after each step of the axis on which the next step is to be taken.

10 Claims, 6 Drawing Figures

METHOD AND APPARATUS FOR PRODUCING DIGITAL CONTOUR MOVEMENT ON AT LEAST THREE AXES

In my U.S. Pat. No. 3,525,917, assigned to the assignee of the present invention, there is disclosed a method and apparatus for effecting movement along a path in a plane wherein the movement consists of sequential steps taken along one or the other of the two axes. The axis on which each step is taken is determined by sensing the algebraic count of an error register and then taking the step on one axis if its count is positive (zero or greater) or on the other axis if the error register count is negative (less than zero). For each step determined and then taken, there is a value algebraically added to the error register with the value being set by the axis on which the step was taken. The new algebraic count of the error register is then queried for the next step and depending on its algebraic count, the axis for the next step is set. Also a value is again algebraically added to the error register to change its count for use in determining the axis on which the following step is to be taken.

By continually repeating the determination for the axis for each step and then taking a step on the axis until all the steps have been taken, a close approximation of the desired path is effected. However, such a system was only usable with two axes thereby limiting the movement to planar paths.

It is accordingly an object of the present invention to provide a method and system for providing movement substantially along a desired path in which the path may require movement along three or four axes.

Another object of the present invention is to achieve the above object with a system that accepts instructions that are essentially only the number of incremental steps from the start to the end of a path along each axis.

A further object of the present invention is to provide a system which achieves the above objects but yet uses a relatively minimum number of components and in which a substantial number of components are common to operation along either three or four axes.

In carrying out the present invention in each of the two embodiments hereinafter described, namely movement on three axes and movement on four axes, each axis has an identical drive means including a motor connected thereto. Upon receipt of a command (herein called a pulse), the drive means produces an incremental rotational movement. This movement may be used to provide relative rotational movement or may be altered, as for example, by a ball nut and lead screw, into an incremental linear movement.

The systems accept input information which consists of the number of incremental movements along each axis which is required to move the part from the beginning of the path to the end of the path which also establishes the linear relationship between the axis. As each pulse to a drive produces a step, the input information if each incremental movement is a step, is basically the number of pulses to be directed to each axis drive means. Also the input information includes the direction of movement along each axis. In both systems there is a register for each axis which maintains a count of a number of steps which each axis motor is to take from its instantaneous position along the path to the end of the path.

In the operation of the systems, an oscillator supplies pulses which are directed by the control unit so that each pulse is directed to one of the axes' drives to provide the incremental movement along that axis. In addition there are provided two error registers which are basically up-down counters and for each step that a motor takes on one drive, a determined number is added to one or both of the error registers with the addition at times being a minus number such that the count of each of the error registers may be positive or negative and the count of at least one will change with each incremental movement. Thus, before the control unit accepts a pulse from the oscillator it determines by interrogation of the signs of the error registers, to which axis it is to direct the pulse and also the quantity that is to be added to the error registers by reason of the pulse being directed to the selected axis. After each incremental step the count of at least one of the error registers will change which in turn will be used to determine the axis to which the next pulse is to be directed and on which the next step is to be taken.

By continually selecting, for each pulse, the axis on which incremental movement is to occur and by decreasing the count of the register for that axis by 1 for each step taken on that axis, the system continually processes pulses from the oscillator until the count of all the registers show that each axis has received the number of pulses commanded by the input information. The oscillator is then caused to cease providing further pulses as the end of the commanded path has been reached.

Other features and advantages will hereinafter appear.

Figure 1:
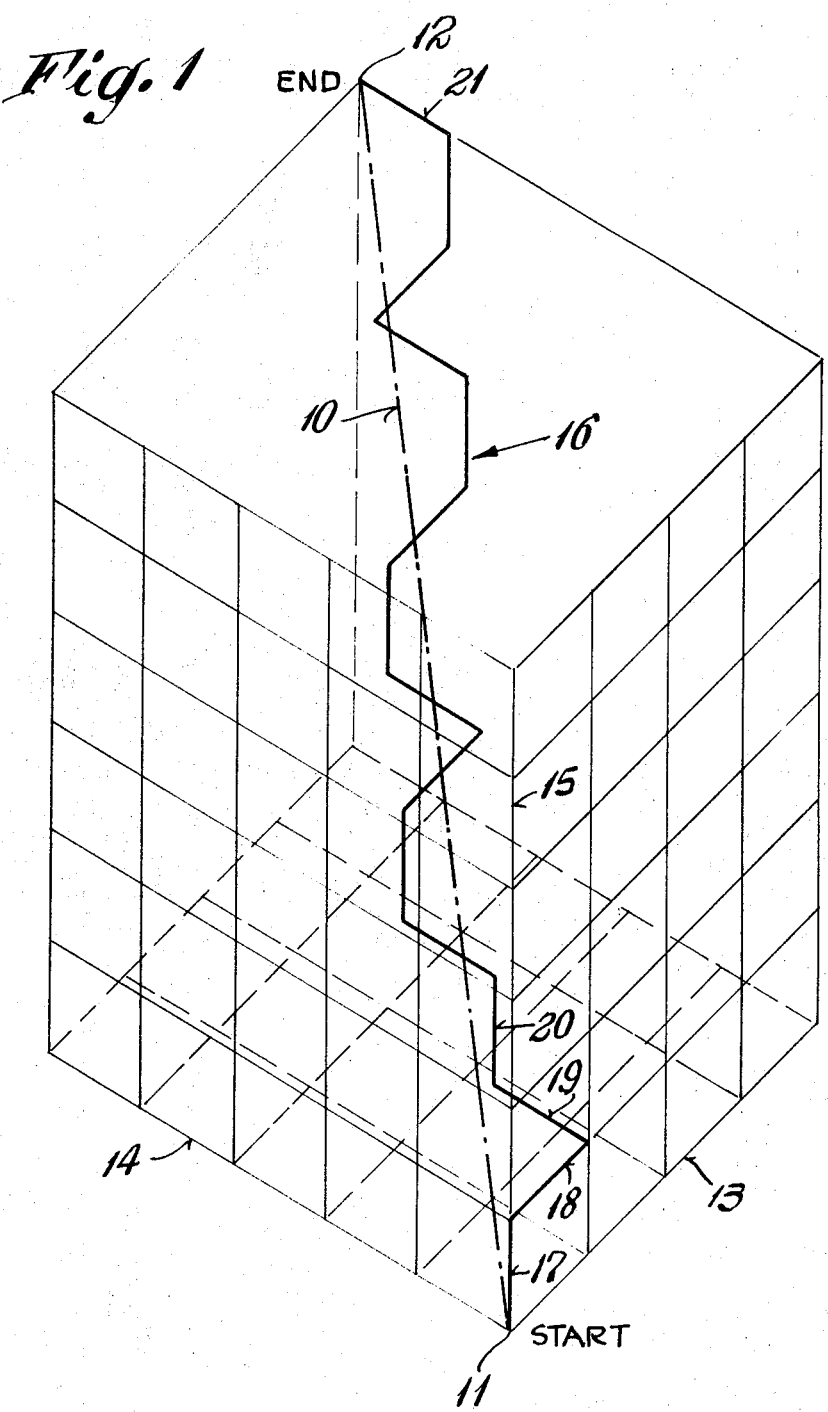
FIG. 1 is a diagrammatic representation of a three axes path caused to be traversed by the present system and an exactly linear desired path.

Referring to FIG. 1, one example of a desired path 10 of movement on three axes from a start 11 of the path to its end 12 is the straight line shown. The path 10 is defined in the present system by the number of equal length, incremental movements along an X axis 13, a Y axis 14 and a Z axis 15. In this particular illustration the path 10 has equal length increments of X = 4, Y = 5 and Z = 6, from the start to the end. The actual path caused by the present system is generally indicated by the reference numeral 16 and consists of a plurality of incremental steps with the total number of steps being equal to the sum of the X, Y and Z movements, namely, 15. Each step is taken only along one of the axes in a manner determined by the system to be hereinafter explained with the steps occurring sequentially as opposed to simultaneously. Thus the path 16 initially requires the taking from the start 11 of a Z step 17 along the Z axis, the next step 18 a step on the X axis, a Y step 19, a Z step 20, etc. until the final step, a Y step indicated by the reference numeral 21 is taken to complete the actual path.

Though in the representation of FIG. 1 it appears that there is a substantial variance between the actual path 16 and the desired path 10 it will be understood that the variance is no more than the length of an increment of movement. In many instances the increment or the length of each step is perhaps 0.001 or 0.0005 inch so that the actual deviation between the desired and actual path is thus substantially less than would appear by casual observation of this figure.

Figure 2:
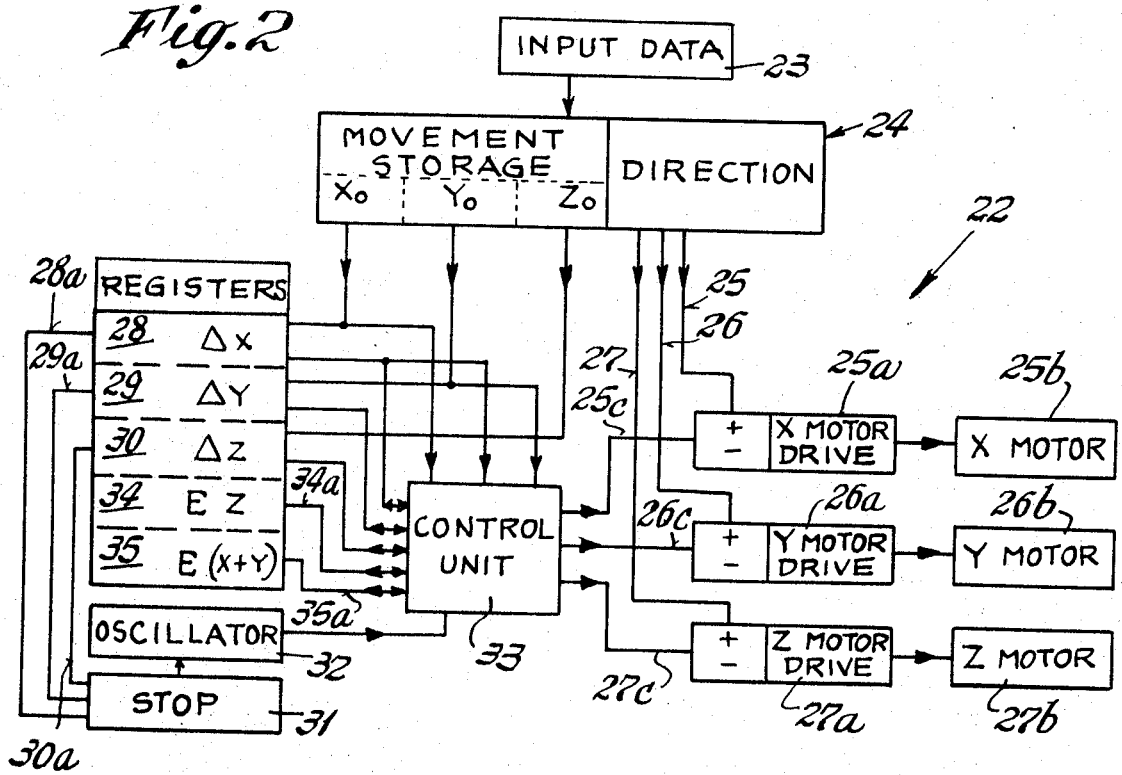
FIG. 2 is a block diagram of the apparatus of the present invention for providing movement along three axes.

Referring to FIG. 2, there is shown a block diagram of the components in the system which produces movement along the three axes X, Y and Z. The system is generally indicated by the reference numeral 22 and includes a source for input data 23 of the commanded path which is stored in a movement storage 24. The input information consists of the actual number of steps along the X axis, the Y axis and the Z axis from the beginning to the end of the command path and such information is hereinafter denoted Xo, Yo, and Zo, respectively. The storage 24 also stores the direction in which each axis movement is to occur, either a + direction or a − direction with this direction information being transferred through lines 25, 26 and 27 to the + or − section of an X motor drive 25a, a Y motor drive 26a and a Z motor drive 27a.

Each of the motor drives is connected to a motor 25b, 26b and 27b, respectively each of which is connected in any well known manner such as a ball nut and lead screw to a part to be moved if linear motion is desired. Each motor drive, such as motor drive 25a has an input 25c (the others being 26c and 27c) on which pulses are received and for every pulse the motor drive will change the energization of their respective motor to cause such a motor to move one increment for each change of energization with there being perhaps 200 increments required for one complete rotation of the motor. The direction in which the motor moves, either clockwise or counterclockwise is determined by the + or − movement direction provided in the lead thereto from the input data information. Thus, for each pulse which is received over each of three leads 25c, 26c and 27c there will be produced an incremental movement along the X axis, the Y axis or the Z axis, respectively with the movement being a step of determined length and with the length being equal for each of the steps.

One form of motor and motor drive which may be employed is shown in U.S. Pat. No. 3,117,268 assigned to the assignee of the present invention. It will be understood, however, that other pulse to step motors and drives may be employed if desired in an open or closed loop configuration.

Also connected to the movement storage 24 are three registers 28, 29 and 30 which are basically down counters and which are set initially to the number Xo, Yo and Zo, respectively and which are caused to decrease their count by 1 for each incremental movement which their respective motor produces. Thus if a pulse is received on input line 25c to move the X motor one step, the ΔX register 28 will have its count decreased by 1. Upon all movement being completed, so that the end 12 is attained, the three registers ΔX, ΔY, and ΔZ (28, 29 and 30) will have a zero count and this information is fed over lines 28a, 29a and 30a to a stop block 31 which prevents an oscillator 32 from producing further pulses for processing to a control unit 33.

The system additionally has connected to the control unit 33, a first error register 34, denoted Ez and a second error register 35, denoted E (X + Y). These registers are basically up-down counters which provide upon leads 34a and 35a respectively information to the control unit 33 of the algebraic sign of their present count, namely, whether or not the count is positive when the register has a count of 0 or greater or whether the count is negative, less than 0. The leads 34a and 35a are also indicative of the transmission from the control unit to each of the registers 34 and 35, information which will change their counts for each step that a motor is commanded to take. This information is dependent on which axis the step is to occur.

Figure 3:
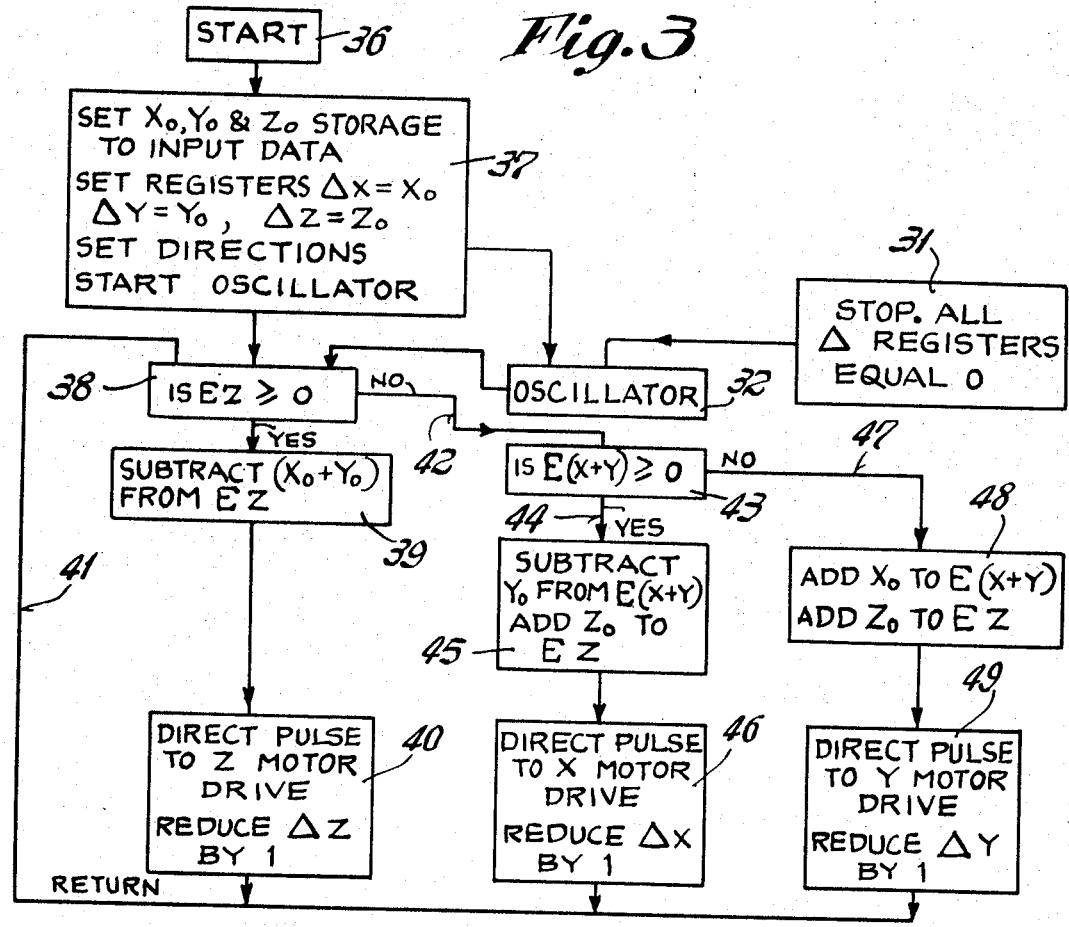
FIG. 3 is a sequence chart indicating the method and steps which the control unit performs in determining the axis to which to direct a pulse.

Shown in FIG. 3 is a sequence chart of the control unit 33 which upon receiving a pulse from the oscillator 32, selects the axis to which a pulse is to be directed by interrogating the algebraic sign of the two registers 34 and 35, sets the numbers that are to be algebraically added to the error registers and effects decreasing of the count of the Δ registers by one for each step. Also shown in this figure are the stop block 31 and the oscillator 32. Initially a block 36 provides a start command to a block 37 which causes the placing of the input command information from the block 23 into the storage 24 units Xo, Yo and Zo. Further it effects the direction command over leads 25, 26 and 27 to be transferred from the input to their respective motor drives while also setting the registers 28, 29 and 30 to the same number as their respective storage units Xo, Yo and Zo.

With this accomplished, the block 37 then instructs the oscillator 32 to begin producing pulses which are initially introduced to a block 38 together with a signal from the block 37 that the preceding instructions have been carried out. The block 38 interrogates the error register 34 as to its count and specifically if the count is either positive, i.e., equal to a greater than 0 or if it is negative, i.e., less than 0. For the first pulse all error registers will each have a count of 0 so that the error register produces a "yes" signal which is fed to a block 39. This block causes subtraction of the sum of Xo + Yo from the register 34 and also causes, by a block 40 the direction of the pulse along the lead 27c to the Z motor drive 27a to produce a Z axis step which is the first incremental movement 17.

After the block 40 commands have been completed a return line 41 indicates to the block 38 that the next pulse from the oscillator should be processed and as the error register 34 is less than 0 the pulse is passed upon a "no" lead 42 to a block 43 which then interrogates the error register 35. As this is the second step, there has been no change in the error register 35 so its count is 0 which passes the pulse on the "yes" lead 44 to a block 45. This block causes the command movement Yo to be subtracted from the error register 35 together with the adding of the command movement Zo to the register 34. The control unit then directs the pulse to a block 46 which permits the pulse to pass along the lead 25c to the X motor drive and also effects reducing of the count of the register 28 by one.

Upon completion of these operations, information thereof is directed over return lead 41 to effect processing of the next pulse from the oscillator. The registers 34 and 35 are now both negative as Zo is less than Xo + Yo so that the control unit passes the pulse along the "no" lead 47 from the block 43 to cause a change in the count of registers 34 and 35 by the adding of Zo to register 34 and Xo to register 35 by a block 48. A subsequent block 49 directs the pulse over the lead 26c to the Y motor drive to cause an incremental movement by the Y motor to produce the step 19.

For each step which a motor is directed to take, its corresponding register 28, 29 or 30 is caused to have its count reduced by 1 by the blocks 40, 46 and 49, respectively for the ΔZ register 30, the ΔX register 28 and the ΔY register 29. Accordingly, as each step is taken and the next pulse is processed the counts of the registers 28, 29 and 30 will be reduced until the count of each reaches 0 at which time this information is used by the block 31 to stop the oscillator 32 from producing any more pulses, and prevent any further movement. The system has thus produced the number of steps on each axes called for by the input data, namely Xo, Yo and Zo and is then in condition to receive information of the next path which is desired to be traversed.

As a specific embodiment of the condition of the registers 28, 29, 30, 34 and 35 and the axis on which a step is taken, there is hereafter set forth a chart of the actual path 16 shown in FIG. 1 wherein Xo = 4, Yo = 5, and Zo = 6. It will be appreciated that at the beginning and end of each input commanded, the two error registers 34 and 35 will have a zero count.

| ΔX(28) | ΔY(29) | ΔZ(30) | EZ (34) | E(X+Y)(35) | Axis |
|---|---|---|---|---|---|
| 4 | 5 | 6 | 0 | 0 | Z |
| 4 | 5 | 5 | −9 | 0 | X |
| 3 | 5 | 5 | −3 | −5 | Y |
| 3 | 4 | 5 | +3 | −1 | Z |
| 3 | 4 | 4 | −6 | −1 | Y |
| 3 | 3 | 4 | +0 | 3 | Z |
| 3 | 3 | 3 | −9 | 3 | X |
| 2 | 3 | 3 | −3 | −2 | Y |
| 2 | 2 | 3 | +3 | +2 | Z |
| 2 | 2 | 2 | −6 | +2 | X |
| 1 | 2 | 2 | +0 | −3 | Z |
| 1 | 2 | 1 | −9 | −3 | Y |
| 1 | 1 | 1 | −3 | +1 | X |
| 0 | 1 | 1 | +3 | −4 | Z |
| 0 | 1 | 0 | −6 | −4 | Y |
| 0 | 0 | 0 | 0 | 0 | ---- |

Though in the illustrated embodiment each of the initial command movements are positive it will be understood that if it is desired to go in the other direction for any one of the three axes that the direction storage 24 would have a negative sign for such an axis and that this would change the direction in which that respective axis motor moves. However, the quantities added to the registers 34 and 35 will be the numerical number indicating the desired movement irrespective of the direction indication. Further the registers 28 through 30 would also be numerically set to the numerical number of movements and not be affected by the direction indication.

While the above embodiment shows a linear movement on three axes it is also contemplated that the movement could be rotational it being understood that there are six possible directions of movement, namely, linear movements on the X, Y and Z axis and also rotational movement about these axes which are commonly called the yaw, pitch and roll. Thus it is to be understood that the invention is not to be limited solely to linear movement as any one of the axes in this embodiment could be a rotational movement with the extent of the movement being indicated by the number of steps its motor is required to take to attain the end of the commanded path.

One example where the present invention has utility is with a vertical milling machine in which the tool quill is operated by the Z axis motor and the worktable carrying the piece to be machined is moved by the X and Y axes motors. It will be understood that the system may be used in other applications where it is desired to provide relative motion in three different directions. The only requirement other than the motor being mechanically coupled to produce the desired motion is that the input data consist of the number of steps which each motor must produce in order to traverse the path from its start to its end with the steps being equal.

Figure 4:
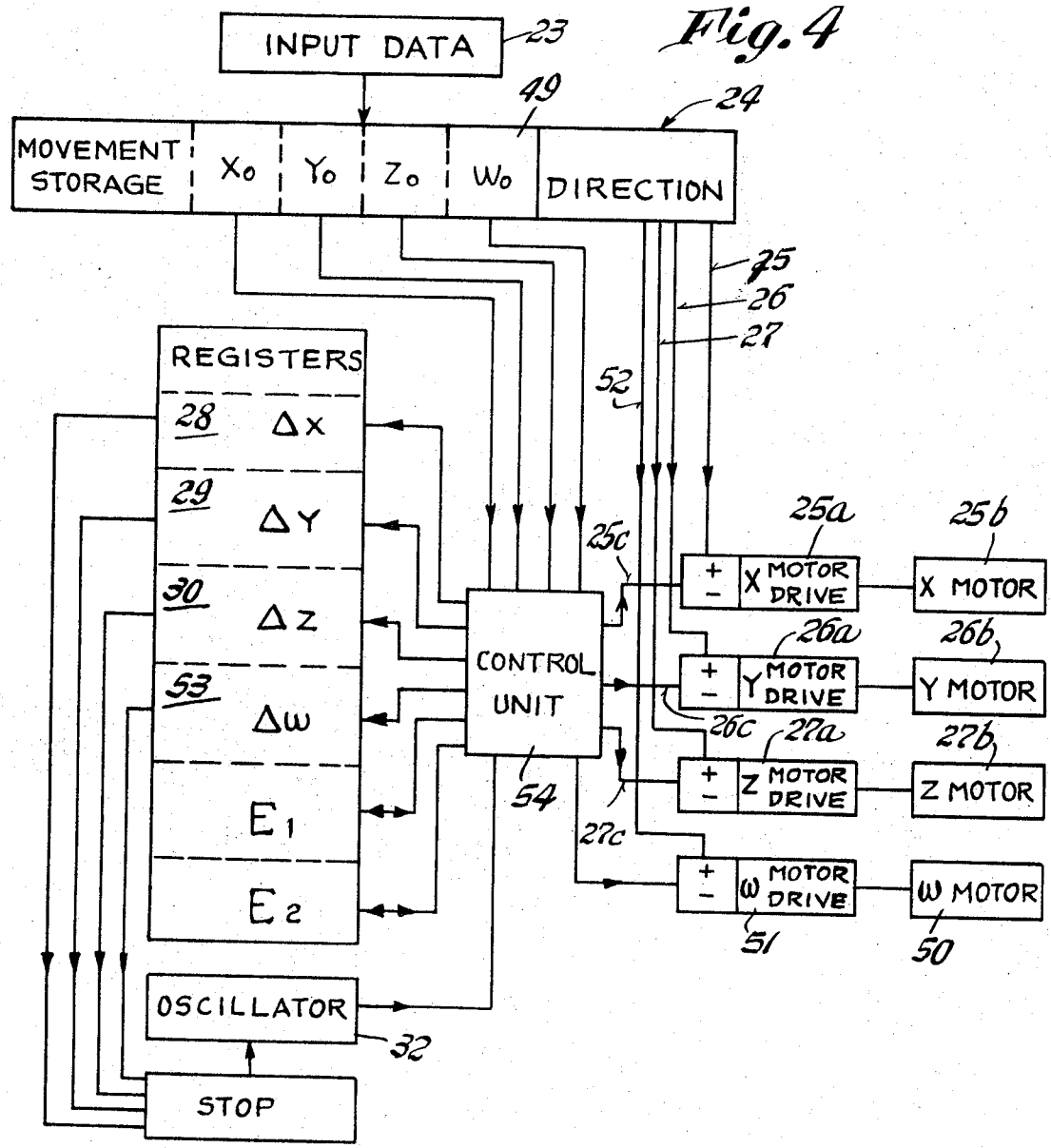
FIG. 4 is a view similar to FIG. 2 only showing a block diagram for a system having four axes of movement.
Figure 5:
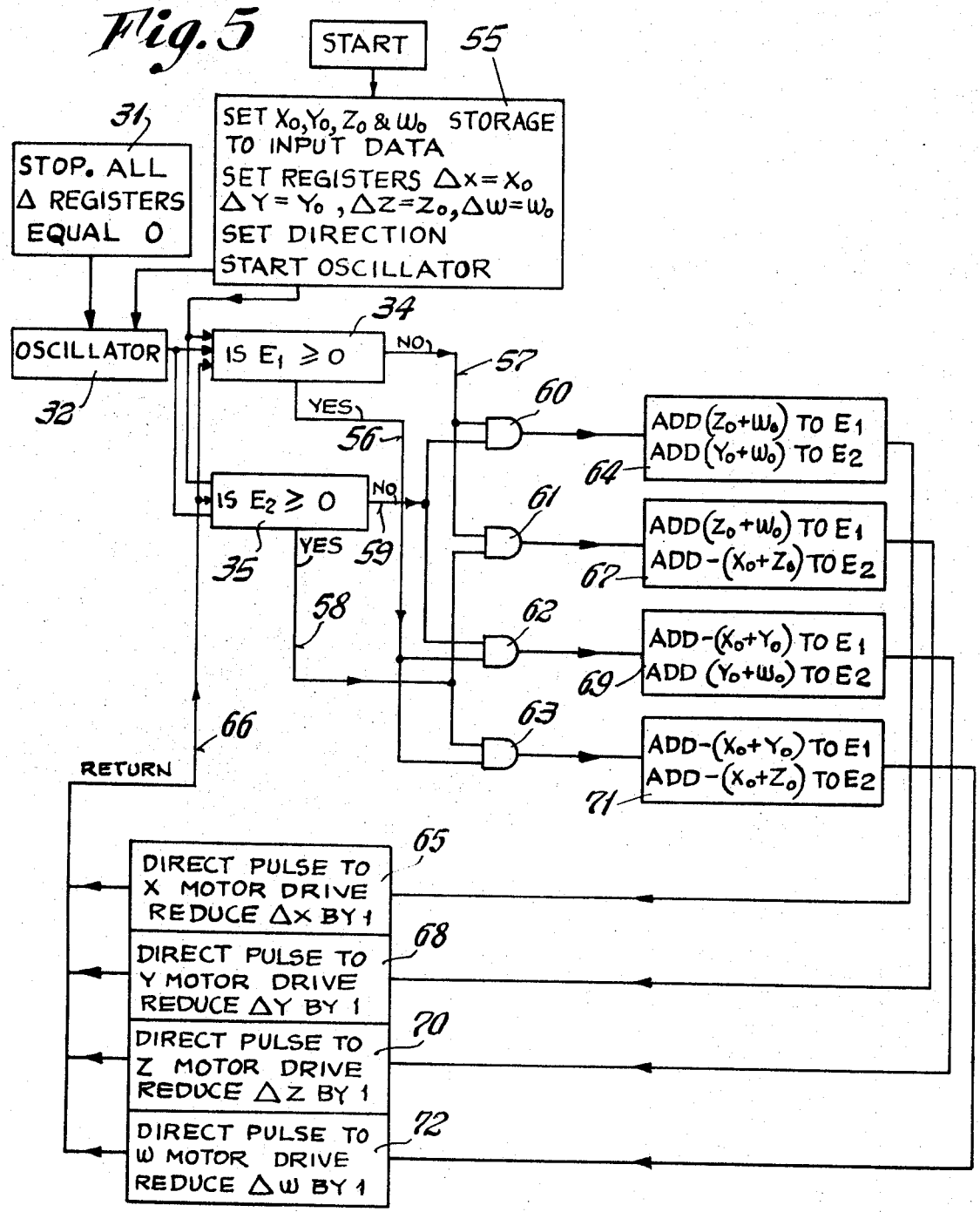
FIG. 5 is a sequence chart showing the steps performed by the control unit in the embodiment shown of FIG. 4.

In the embodiment of the invention shown in FIGS. 4 and 5, the system is capable of controlling movement along four axes, the fourth being termed the W axis, rather than three as in the prior embodiment. A substantial number of components are identical to the two systems and have been given the same reference number. Additions to the system shown in FIG. 2 to obtain four axes movement are a Wo storage unit 49 in the movement storage 24 for containing the commanded number of increments of equal movements on the W axis; a W motor 50 and its associated motor drive 51; a lead 52 connected to the direction storage in order to control the direction of movement of the motor 50 and a ΔW register 53. The four axes system functions in the same manner as the three axes system in that the input data consists of a number of equal movements along each of the four axes that is required to move or provide relative movement from the start to the finish of a desired path.

The control unit 54 is somewhat different than in the prior embodiment and referring to FIG. 5, a block 55 which when actuated by the start block sets the registers 28, 29, 30 and 53 to the input data ΔX, ΔY, ΔZ and ΔW respectively; sets the direction for each of the axes drives and initiates operation of the oscillator 32. In this embodiment rather than sense the count of each of the error registers 34 and 35 sequentially, they are sensed essentially simultaneously so that a pulse from the oscillator is directed to the first register 34 to produce on a "yes" lead 56 information that the count of register 34 is positive or information on a "no" lead 57 if it is negative and to error register 35 which produces information on either a "yes" lead 58 or a "no" lead 59.

The leads 56–59 are connected to four AND gates 60–63 respectively in the manner shown such that only one gate can pass information at a time. For the gate 60 to pass information, error registers 34 and 35 both must be negative; for gate 61 to pass information, error register 34 must be negative and error register 35 positive; for the gate 62 to pass information, error register 34 must be positive and register 35 negative while gate 63 passes information only when both registers are positive.

The gate 60 is connected to a block 64 such that when gate 60 passes information, block 64 directs the addition of the sum of the increments of movement (Zo) along the Z axis and the increments (Wo) along the W axis to the first register 34 together with the addition of the sum of the increments of movement (Yo) on the Y axis added to the increments of movement (Wo) along the W axis to the error register 35. With this being completed, the block 65 then causes the directing of a pulse to the X motor drive 25a and the reducing of the count of the ΔX register 28 by 1. Completion of this operation is indicated over a return line 66 that is connected to both error registers and permits the registers to then process the next pulse from the oscillator 32.

Similarly, information through the gate 61 causes block 67 to direct the addition of the increment Zo plus Wo to the first register 34 and effects subtraction of the sum of Xo plus Zo from the second register 35. With this accomplished a block 68 directs a pulse to the Y motor drive 26a and reduces the count of the ΔY register 29 by 1 before indicating on the return lead 66 that the next pulse is to be processed. Gate 62 when passing information by reason of register 34 being "yes" and register 35 being "no," causes, as indicated on block 69, subtraction of the sum Xo plus Yo from the register 34 and the addition of Yo plus Wo from register 35 with a block 70 being directed to effect movement on the Z axis of one increment and reducing the count of the ΔZ register 30 by 1.

The only other remaining possibility with respect to the counts of two registers 34 and 35 is when both registers are "yes" which causes a block 71 to subtract the sum of Xo plus Yo from register 34 and to subtract the sum of Xo plus Zo from register 35. Block 72 then effects a direction to the W motor 50 one increment and reduces the ΔW register 53 by a count of 1 with completion thereof then being passed on the return lead 66 to effect processing of the next pulse.

The processing of each pulse sequentially continues until all four registers 28, 29, 30 and 53 are zero, at which time the block 31 will prevent the oscillator 32 from providing any further pulses. The commanded path has thus been traversed and the system is now ready to process information for the next path.

Figure 6:
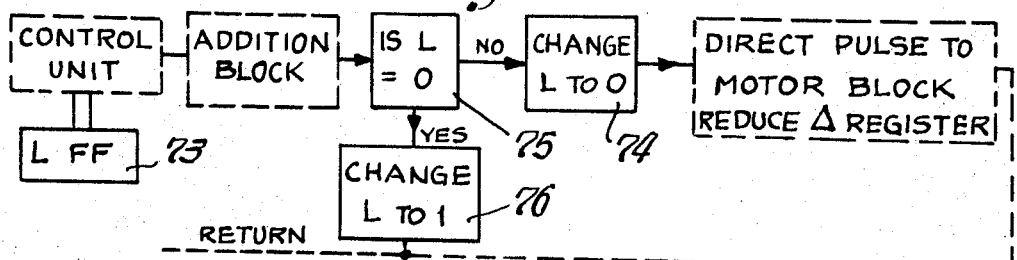
FIG. 6 is a block diagram of a modification that may be incorporated in each axis to provide a closer approximation of the actual movement to the desired path.

While the above-described embodiments of the present invention maintain the deviation of the actual path from the desired path to no greater than the extent of one increment measured along any axis, if desired, the deviation may be reduced by utilizing the invention shown in my U.S. Pat. No. 3,585,478, assigned to the assignee of the present invention. The components for reducing the deviation are shown in FIG. 6 for one axis and include a flip-flop denoted an L flip-flop 73 in the control unit and three blocks 74, 75 and 76. The last three blocks are inserted between the addition blocks such as the blocks 39, 45, 48, 64, 67, 69 and 71 and the motor directing blocks corresponding thereto, namely, 40, 46, 49, 65, 68, 70 and 72. The block 75 questions whether the flip-flop 73 is in its 0 state and if it is the only effect of the processed pulse is to change the L flip-flop to the 1 state and then indicate to the error registers over the return lead to process the next pulse. However, the pulse does effect the algebraic addition to the error registers. If on the other hand, the flip-flop 73 is in its 1 state, then the block 74 changes it to the zero state before directing a pulse to the motor directing block. In this manner the system determines the axis on which each pulse is to be directed, performs the addition therein but permits only every other pulse to be a pulse that effects the movement. If desired, more than every other pulse may be used as a motor directing pulse, as for example, every third, fourth, or fifth, etc., simply by using a counter, for example, which divides out the fraction of the pulses received by an axis that is for directing a movement.

The structure of the systems above-described and their closeness of the actual path to the desired path is for linear or proportionally rotational movement. If circular motion is required such as, for example, when X and Y are in a plane and commanded to move in an arcuate path while Z is linear which could be typical of a helical path, then the decision to move on either the X or Y axis is determined in the same way as shown in my above-noted U.S. Pat. No. 3,525,917. As the extent of the arc increases, i.e., approaches 90°, there tends to be a greater deviation of the actual path from the desired path. This may be minimized to an acceptable level by reducing the extent of each commanded arc rather than integrating the arc into small straight line segments. The former further requires less input information.

While the two above-described embodiments disclose using the initial number of increments of movement as the values to be added to the error register, it is also contemplated that, intermediate values of the number of movements remaining may also be used. These values are maintained in the Δ registers 28,20,30 and 53 so are available for use and thus could eliminate the need for the storage means units Xo, Yo, Zo and Wo.

It will accordingly be understood that there has been disclosed a system for accepting input information consisting of the number of incremental movements on three or more axes and in which the system provides a desired relative movement that closely approximates the desired path set by the input information. The movement consists of equal increments that occur only along an axis and the system determines for each increment the axis on which a signal is to be directed to effect a movement by interrogation of the algebraic count of a pair of error registers. The count of the error registers is changed at least for each signal by values that are related to the movement along the other axis to which the signal is directed.

The system continuously repeats the determination until the number of signals to each axis equals the command information thereto, when the system prevents further signals. The movement has thus been completed from the start to the end of the path.

Variations and modifications may be made within the scope of the claims and portions of the improvements may be used without others.

I claim:

1. The method of producing movement substantially along a path set by command information representing the number of equal steps to be taken on at least three axes from the start to the end of the path with the movement consisting of a plurality of steps taken only along an axis and with only one step being directed to be taken at a time comprising the steps of providing a pair of error registers with each capable of having two different algebraic counts, sensing the counts of the error registers, selecting on the basis of the counts one axis on which a step is to be taken while preventing the taking of a step on the remaining axes, directing a step to be taken on the selected axis and changing the count of at least one of the error registers by algebraically adding thereto a number related to the movements on the remaining axes.

2. The invention as defined in claim 1 in which there is a first, second and third axis and in which the step of selecting includes the step of preventing the taking of a step on the first and second axis for one count of the first error register while enabling a step to be taken on the third axis for the same count.

3. The invention as defined in claim 2 in which there is a fourth axis and in which one count of the second error register selects the third axis to be directed to take a step while preventing the fourth axis from being directed.

4. The invention as defined in claim 2 in which there are only three axes and in which enabling of the step on the third axis causes the directing of a step on the third axis.

5. The invention as defined in claim 1 in which there is a first, second and third axes, and in which the step of selecting includes enabling the directing of the taking of a step on the first and second axes while preventing the directing of taking a step on any remaining axes for an other count of the first error register, and further includes enabling the first axis to be directed to take a step while preventing the second axis for one count of the second error register.

6. The invention as defined in claim 5 in which the second error register has the other count and in which said other count enables the second axis to be directed to take a step while preventing the first axis.

7. The invention as defined in claim 1 in which there is the step of counting for each axis the number of steps that are to be directed to be taken by each and terminating the directing of the taking of any further steps only when the number of steps directed to each axis is identical with the number set by the command information.

8. The invention as defined in claim 1 in which the step of changing the count includes algebraically adding the sum of the values of two remaining axes to one error register.

9. The invention as defined in claim 8 in which there is a fourth axis, and in which the step of changing the count includes the step of algebraically adding the sum of one remaining axis with another remaining axis and the sum of the one remaining axis with a third of the remaining axis.

10. A system for producing relative movement along a path set by command information representing the number of equal steps to be taken along at least three axes comprising means for at least initially storing the number of steps for each axis, a pair of error counting registers with each register providing an indication of its algebraic count, means for providing one movement on each axis in response to a signal, means for continually sequentially sensing the counts of the error registers and sending a signal to only one selected axis for each count sensed, means for changing the count of at least one of the error registers by algebraically adding thereto a number related in value to the movements on the remaining axis for at least each signal prior to the sensing of the next signal, means for counting the number of signals sent to each axis that produces a movement and means for terminating the supplying of signals when the number of movements for each axis equals the number therefor initially stored.

* * * * *